(12) United States Patent
Meadows

(10) Patent No.: US 7,198,010 B2
(45) Date of Patent: Apr. 3, 2007

(54) LOST ANIMAL RETRIEVING METHOD

(76) Inventor: Louis B. Meadows, 5200 White Oak Ave., #46, Encino, CA (US) 91316

( * ) Notice: Subject to any disclaimer, the term of this patent is extended or adjusted under 35 U.S.C. 154(b) by 212 days.

(21) Appl. No.: 11/074,911

(22) Filed: Mar. 8, 2005

(65) Prior Publication Data

US 2006/0201447 A1    Sep. 14, 2006

(51) Int. Cl.
*A01K 29/00* (2006.01)
*G06F 17/00* (2006.01)

(52) U.S. Cl. .................... 119/720; 707/104.1

(58) Field of Classification Search ........... 119/720, 119/719, 718, 721; 340/573.1, 568.1, 573.4; 707/6, 104.1
See application file for complete search history.

(56) References Cited

U.S. PATENT DOCUMENTS

| | | | | |
|---|---|---|---|---|
| 5,878,116 A * | 3/1999 | Scott | ............... | 379/67.1 |
| 5,955,952 A * | 9/1999 | Bergman et al. | ......... | 340/573.1 |
| 6,067,018 A * | 5/2000 | Skelton et al. | ........... | 340/573.3 |
| 6,183,258 B1 * | 2/2001 | Cobb et al. | ............... | 434/154 |
| 6,401,095 B1 * | 6/2002 | Adler | ............... | 707/10 |
| 6,581,073 B1 * | 6/2003 | Adler | ............... | 707/200 |
| RE38,343 E * | 12/2003 | Bergman et al. | ......... | 340/573.1 |
| 6,748,400 B2 * | 6/2004 | Quick | ............... | 707/104.1 |
| 6,792,465 B1 * | 9/2004 | Welsh | ............... | 709/229 |
| 6,845,382 B2 | 1/2005 | Meadows | | |
| 6,910,050 B2 * | 6/2005 | Pawlick | ............... | 707/104.1 |
| 6,950,024 B2 * | 9/2005 | Wunderlick | ............... | 340/573.1 |
| 6,973,449 B2 * | 12/2005 | Meltzer | ............... | 707/1 |
| 7,055,463 B2 * | 6/2006 | Welsh | ............... | 119/712 |
| 7,072,892 B2 * | 7/2006 | Hertz et al. | ............... | 707/6 |
| 7,080,149 B1 * | 7/2006 | Welsh | ............... | 709/229 |
| 7,088,242 B2 * | 8/2006 | Aupperle et al. | ...... | 340/539.32 |
| 2002/0147650 A1 * | 10/2002 | Kaufman et al. | ............. | 705/22 |
| 2004/0019609 A1 * | 1/2004 | Orton et al. | ............. | 707/104.1 |

* cited by examiner

*Primary Examiner*—Yvonne R. Abbott
(74) *Attorney, Agent, or Firm*—Trojan Law Offices

(57) ABSTRACT

A method and system for retrieving a lost animal and rewarding a location such as an animal shelter for successful retrieval of the lost animal is provided. An animal owner subscribes to the system, providing subscriber information and identifying data of his animal. The subscriber reports to a central database system that his animal is lost and is provided with a compiled database of locations where a lost animal may be located. Using the database, the subscriber transmits or delivers the subscriber information and the identifying data of the animal to the locations. Alternatively, the central database system transmits the identifying data and the subscriber information to the locations. A reward is provided to the location where the lost animal is retrieved.

15 Claims, 1 Drawing Sheet

LOST ANIMAL RETRIEVING METHOD

FIELD OF THE INVENTION

The present invention relates to a method and system for retrieving lost animals and, more particularly, to a method and system for retrieving lost animals using a complied database of locations where a lost animal may be kept and providing a reward for the location where the lost animal is retrieved.

BACKGROUND OF THE INVENTION

It is reported that every five seconds another pet is lost. Typically, pet owners try to find their lost pets by posting flyers on telephone poles and in such places as grocery stores and pet shops, or visiting veterinarian offices and animal shelters regularly. However, the number of flyers that a pet owner can afford to post is limited by his budget. Furthermore, since posted flyers are easily missing or damaged, a pet owner has to examine them frequently and replace the missing or damaged flyers. Visiting veterinarians and animal shelters is similarly burdensome because it takes time and costs of travel. Some animal rescue groups recommend that a pet owner visit such locations every day or two to see if they have his pet.

Most animal shelters and rescue groups are financially burdened in matters such as feeding and housing lost pets. As a result, after certain holding period, pets are usually adopted or even euthanized. Therefore, to save and retrieve his lost pet, a pet owner has to take a retrieving method that is efficient and not time-consuming. Also, it is necessary and mutually beneficial to provide animal shelters and rescue groups with some financial incentive to identify a lost pet and return it to its owner.

The patent of Meadows, U.S. Pat. No. 6,845,382 discloses a system and method for identification and retrieval of lost pets whereby the system receives identifying data including noseprints of pets and compares a noseprint of a found pet with those in the noseprint database to identify and locate the owner of the pet.

SUMMARY OF THE INVENTION

The purpose of the present invention is to provide an efficient system and method for retrieving lost animals such as pets. The method involves using a compiled database of all locations where a lost animal may be found such as animal shelters and rescue groups and providing a reward for the shelter for successful retrieval of the lost animal.

In accordance with the present invention, an animal owner subscribes to the system. In a preferred embodiment, the animal owner subscribes to the system for a fee. Data including but not limited to identifying data of his animal such as a photograph and description and the subscriber information are received from the subscriber by a central database system. The data are entered and stored in the central database. On or after the subscription, the subscriber reports to the central database system that his animal is missing, providing information relating to and including its last known location, time, and description. The central database system retrieves the identifying data of the animal and the subscriber information, updates them, if necessary, and sends them as electronic files to the subscriber. For example, the central database system can transmit the data through the Internet. As another example, a disk containing the data can be sent to the subscriber. The central database system also provides the subscriber with electronic data containing the information of animal shelters and other similar entities, such as location, phone number, fax number, and email address. At the same time, the central database system provides the subscriber with a communication means such as a software that links the subscriber's electronic environment such as an on-line computer to each animal shelter's email or fax, whereby the subscriber information and the identifying data of the animal with a lost animal notice are automatically sent to the shelters.

As another method, if the subscriber does not have access to the Internet or to a device such as a computer that processes electronic information, he can receive the information of animal shelters by fax, telephone, mail, or by other transmitting method that is available to him. The subscriber can request the central database system to fax or mail him the identifying data of the animal and the subscriber information stored in the central database. Using the faxed or mailed data sheet and the information of animal shelters given to him, the subscriber can contact the animal shelters by fax, mail, telephone, or by any other transmitting method that is available to him. Alternatively, the subscriber can visit the animal shelters to search for the lost animal. To facilitate the search, the subscriber can bring with him the data sheet of the subscriber information and the identifying data of the animal.

As another embodiment, the central database system can transmit the updated identifying data of the animal and subscriber information directly to the animal shelters by any transmitting method described above.

In receipt of such data and information, each animal shelter uses the information received to see if the description of the lost animal matches that of any animal that they are keeping. If there is a match, the animal shelter notifies the subscriber. If retrieving the lost animal is successful, the animal shelter receives a reward from the central database system.

DETAILED DESCRIPTION OF THE INVENTION

Figure 1:
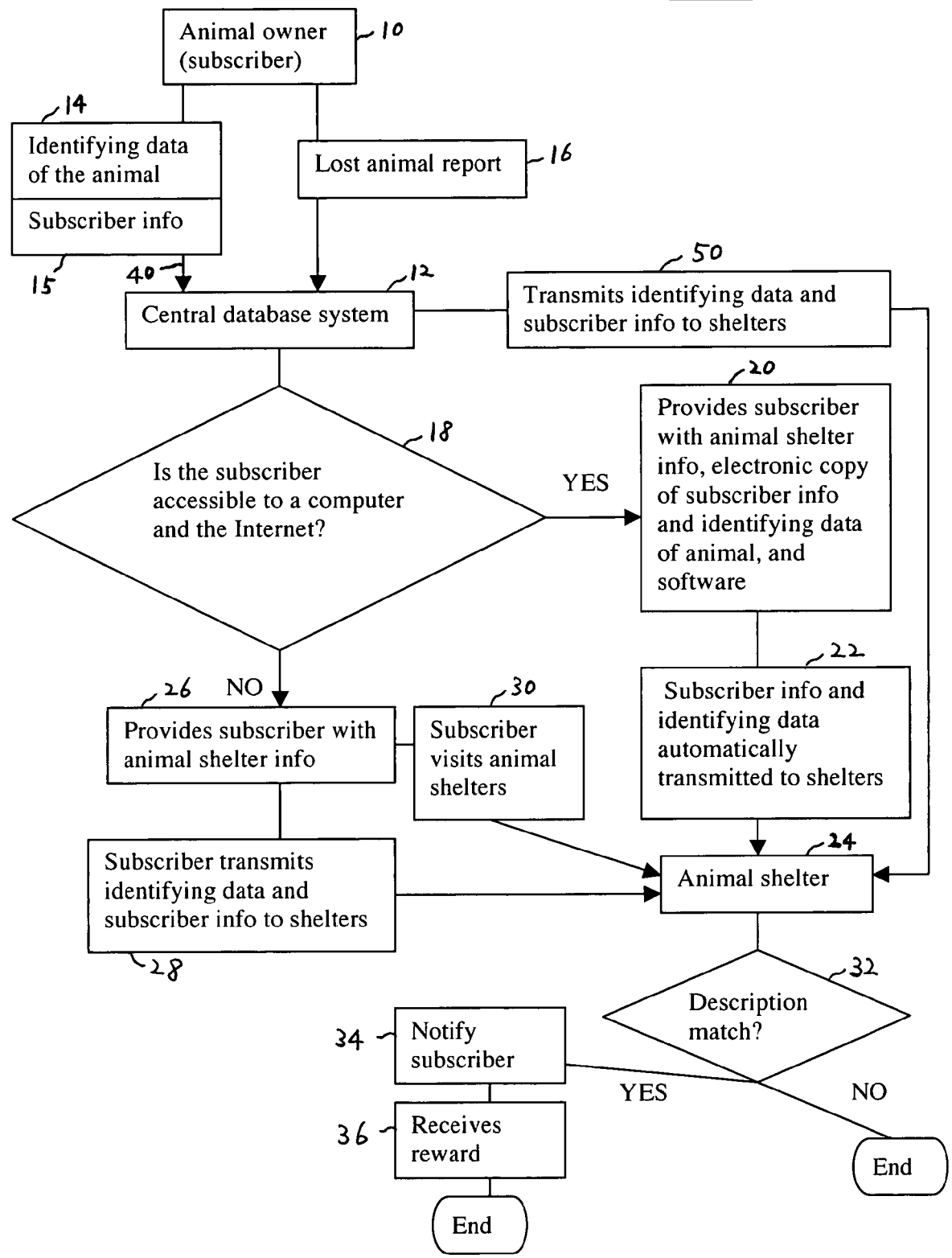
FIG. 1 is a flow chart illustrating a method and system of retrieving a lost animal and rewarding an animal shelter for successful retrieval of the lost animal.

A method and system of retrieving a lost animal and rewarding an animal shelter for successful retrieval of the lost animal is illustrated in FIG. 1. An animal owner 10 receives a subscription package either directly from a central database system 12 or from an animal site such as an animal shelter that was recruited to promote animal owners' subscription to the system. The central database system 12 provides a commission for the animal shelter for each subscription brought by the animal shelter's promotion efforts.

The subscription package includes an application detailing information about the animal owner's animal 14 and information regarding the animal owner 15. Information about the animal is identifying information of the animal 14 including but not limited to a full-body photograph of the animal and the animal's noseprint if applicable and description such as breed, sex, age, weight, color, and markings. The animal's noseprint can be obtained by methods disclosed in the prior art. The patent of Meadows, U.S. Pat. No. 6,845,382, discloses methods to obtain accurate noseprints.

The subscription package includes a dog-nose kit for a dog that is a set of materials and devices necessary for obtaining noseprints. Information regarding the animal owner 15 includes his name, address, contact numbers, and email address. The subscription package also includes a form for reporting a lost animal.

After completion of the application, the animal owner 10 sends the central database system 12 the completed application with identifying data of the animal 14 and contact information 15. All data are entered into the central database 40 and can be retrieved at any given time.

On or after subscription, should the animal be lost, the animal owner 10, that is, the subscriber, can give a lost animal report 16 to the central database system 12. The lost animal report 16 includes the time and the location where the animal was last seen and any changes in the identifying data of the animal and in the subscriber information. In receipt of the lost animal report 16, the central database system 12 retrieves the identifying data of the animal 14 and the subscriber information 15, updates them, if necessary, and sends them preferably as electronic files to the subscriber 10. For example, the central database system 12 can transmit the data through the Internet or by email. As another example, the central database system 12 can copy the data onto a disk and send the disk to the subscriber 10.

The central database system 12 also provides the subscriber 10 with electronic data containing information of locations such as animal shelters where the lost animal is most likely found 20. The central database system 12 has a database of all such locations. The database of such locations includes their address, phone number, fax number, and email address. Based upon the animal's last seen point, the central database system 12 compiles a database of locations where the animal is most likely located, and provides the subscriber with the compiled data. It is generally known that about 90% of lost animals are found within a few miles radius of the point where they are lost. As another method, the scope of search can be customized upon the subscriber's request. For example, the subscriber 10 can decide what areas and how many miles radius of an area to be searched. Based upon the subscriber's request, the central database system 12 compiles a database of relevant locations and gives it to the subscriber. As still another method, the subscriber 10 can be given the database of all locations and can make a selection of locations by himself.

In addition to the identifying data of the animal, the subscriber information, and the database of animal shelters in the form of electronic data, the central database system 12 provides the subscriber 10 with a communication means such as a software that interfaces between subscriber's electronic environment such as a computer connected to the Internet and a data receiving means such as email or fax of each shelter 20. In other words, through the operation of the software, the subscriber's computer, while it is on-line, is linked to each animal shelter's email or fax, whereby the subscriber information 15 and the identifying data of the animal 14 are automatically emailed or faxed to each shelter 22. A message of a lost animal notice is automatically attached to the data and transmitted to each shelter 24. Also, attached is a message notifying a shelter 24 to contact the central database system 12 for a reward if the lost animal is successfully retrieved.

As another method, if the subscriber 10 does not have access to a computer network or to a device such as a computer that processes electronic information, he can receive the information of animal shelters by fax, telephone, mail, or by other transmitting method that is available to him 26. The subscriber 10 can request the central database system 12 to fax or mail him the data sheet of the identifying data of the animal 14 and the subscriber information 15 stored in the central database. Such data sheet is useful because all the important information is already organized and written in the sheet. It is useful especially when the animal owner 10 has lost a photograph of the animal because once the animal is lost the animal owner 10 cannot take a picture of it. Using the data sheet and the information of animal shelters given to him, the subscriber 10 can contact the animal shelters 24 by fax, mail, telephone, or by any other transmitting method that is available to him 28. The subscriber 10 also informs the shelters 24 that the central database system 12 would provide a reward for the shelter that uses the identifying data 14 to find the lost animal and brings a result of retrieving it. Alternatively, the subscriber 10 can visit the animal shelters 24 to search for the lost animal 30. To facilitate the search, the subscriber 10 can bring the data sheet with him.

As another embodiment, instead of providing the subscriber 10 with the retrieved identifying data 14 and the database of animal shelters, the central database system 12 can transmit the identifying data of the animal 14 and the subscriber information 15 with the lost animal notice and the reward notice to the animal shelters 24 by any transmitting method described above 50.

In receipt of the identifying data of the lost animal 14, each animal shelter 24 uses the information received to see if the description of the lost animal matches that of any animal that they are keeping 32. If there is a match, the animal shelter notifies the subscriber 34. If retrieving the lost animal is successful, the animal shelter 24 contacts the central database system 12 and requests a reward. The central database system 12 contacts the subscriber 10 to confirm the retrieval of the lost animal. If retrieval of the animal is confirmed, the central database system 12 issues a reward 36 to the animal shelter 24. Another method is that the subscriber 10 notifies the central database system 12 of the successful retrieval of the animal so that the central database system 12 issues a reward 36 to the shelter 24.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A lost animal retrieving method comprising:
   receiving subscriber information and identifying data of said subscriber's animal;
   receiving a report of said animal being lost including said animal's last known point of place;
   providing said subscriber with a database of locations where said lost animal is most likely located based upon said last known point of place;
   transmitting by said subscriber said subscriber information and said identifying data of said animal to said locations;
   providing a reward for said location that uses said identifying data of said animal whereby said animal is retrieved.

2. The method of claim 1, wherein said database of said locations provided is a form of electronic data.

3. The method of claim 2, wherein said subscriber is provided with an electronic copy of said subscriber information and said identifying data of said animal.

4. The method of claim 3, wherein said database of said locations, said subscriber information, and said identifying data of said animal provided are located in one same electronic environment.

5. The method of claim 4, wherein said subscriber is accessible to said electronic environment.

6. The method of claim 5, wherein said subscriber is provided with a communication means that interfaces between said electronic environment and a data receiving means of said each location;

whereby said subscriber information and said identifying data of said animal are automatically transmitted to said locations.

7. The method of claim 6, wherein said electronic environment is a computer connected to a computer network.

8. The method of claim 7, wherein said communication means is software.

9. The method of claim 8, wherein said data receiving means is an email system.

10. The method of claim 8, wherein said data receiving means is a fax.

11. The method of claim 1, wherein said subscriber is provided with a copy of said subscriber information and said identifying data of said animal;

whereby said subscriber transmits said subscriber information and said identifying data of said animal to said locations.

12. A lost animal retrieving method comprising:
  receiving subscriber information and identifying data of said subscriber's animal;
  receiving a report of said animal being lost including said animal's last known point of place;
  providing said subscriber with a database of locations where said lost animal is most likely located based upon said last known point of place;
  traveling to said locations by subscriber to search for said lost animal;
  providing a reward for said location where said animal is retrieved.

13. The method of claim 12, wherein said subscriber is provided with a copy of said subscriber information and said identifying data of said animal.

14. The method of claim 13, wherein said subscriber brings said copy of said subscriber information and said identifying data of said animal to said locations.

15. A lost animal retrieving method comprising:
  receiving subscriber information and identifying data of said subscriber's animal;
  receiving a report of said animal being lost including said animal's last known point of place;
  compiling a database of locations where said lost animal is most likely located based upon said last known point of place;
  transmitting said subscriber information and said identifying data of said animal to said locations;
  providing a reward for said location that uses said identifying data of said animal whereby said animal is retrieved.

* * * * *